(12) United States Patent
Pope et al.

(10) Patent No.: US 8,473,331 B2
(45) Date of Patent: *Jun. 25, 2013

(54) COMPUTER-IMPLEMENTED SYSTEMS AND METHODS FOR DETERMINING FUTURE PROFITABILITY

(75) Inventors: David Carter Pope, Raleigh, NC (US); Robert Leo Szczerba, Madloon Heights, MI (US); Liewellyn Arthur Gaiway, Ashburn, VA (US)

(73) Assignee: SAS Institute Inc., Cary, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/433,319

(22) Filed: Mar. 29, 2012

(65) Prior Publication Data

US 2012/0185289 A1    Jul. 19, 2012

Related U.S. Application Data (63) Continuation of application No. 12/463,003, filed on May 8, 2009, now Pat. No. 8,185,432.

(51) Int. Cl.
*G06Q 10/00* (2012.01)

(52) U.S. Cl.
USPC ........................................................ 705/7.37

(58) Field of Classification Search
USPC .............................................. 705/7.35, 7.37
See application file for complete search history.

(56) References Cited

U.S. PATENT DOCUMENTS

| | | |
|---|---|---|
| 5,615,109 A | 3/1997 | Eder |
| 5,873,080 A | 2/1999 | Coden et al. |
| 6,006,225 A | 12/1999 | Bowman et al. |
| 6,249,770 B1 | 6/2001 | Erwin et al. |
| 6,282,537 B1 | 8/2001 | Madnick et al. |
| 6,338,066 B1 | 1/2002 | Martin et al. |
| 6,345,271 B1 | 2/2002 | Dempsey et al. |
| 6,393,479 B1 | 5/2002 | Glommen et al. |
| 6,430,553 B1 | 8/2002 | Ferret |
| 6,523,022 B1 | 2/2003 | Hobbs |
| 6,584,465 B1 | 6/2003 | Zhu et al. |
| 6,615,247 B1 | 9/2003 | Murphy |
| 6,631,372 B1 | 10/2003 | Graham |
| 6,654,735 B1 | 11/2003 | Eichstaedt et al. |
| 6,668,251 B1 | 12/2003 | Goldberg |
| 6,718,324 B2 | 4/2004 | Edlund et al. |
| 6,745,178 B1 | 6/2004 | Emens et al. |
| 6,766,370 B2 | 7/2004 | Glommen et al. |
| 6,834,276 B1 | 12/2004 | Jensen et al. |
| 6,836,773 B2 | 12/2004 | Tamayo et al. |
| 7,110,960 B2 | 9/2006 | Phillips et al. |
| 7,146,359 B2 | 12/2006 | Castellanos |

(Continued)

OTHER PUBLICATIONS

Clieaf, Mark Van. "Identifying your Most Profitable Customers" Business Quarterly, pp. 54-60; Winter 1996.*

(Continued)

*Primary Examiner* — John Hayes
*Assistant Examiner* — Allen J Jung
(74) *Attorney, Agent, or Firm* — Kilpatrick Townsend & Stockton LLP (57) ABSTRACT

Computer-implemented systems and methods are provided for determining future profitability for an entity. A present profitability model is generated for the entity based upon present values for a plurality of components of profitability. The present profitability model is used to create a future profitability forecast for the entity.

30 Claims, 12 Drawing Sheets

U.S. PATENT DOCUMENTS

| | | | |
|---|---|---|---|
| 7,158,986 | B1 | 1/2007 | Oliver et al. |
| 7,251,589 | B1 | 7/2007 | Crowe et al. |
| 7,260,568 | B2 | 8/2007 | Zhang et al. |
| 7,266,559 | B2 | 9/2007 | Cook et al. |
| 7,278,105 | B1 | 10/2007 | Kitts |
| 7,302,426 | B2 | 11/2007 | Bier |
| 7,330,850 | B1 | 2/2008 | Seibel et al. |
| 7,363,300 | B2 | 4/2008 | Davis et al. |
| 7,395,259 | B2 | 7/2008 | Bailey et al. |
| 7,424,486 | B2 | 9/2008 | Whitman et al. |
| 7,461,056 | B2 | 12/2008 | Cao et al. |
| 7,464,089 | B2 | 12/2008 | Oh et al. |
| 7,577,641 | B2 | 8/2009 | Koch et al. |
| 7,685,195 | B2 | 3/2010 | Pope |
| 8,185,432 | B2 | 5/2012 | Pope et al. |
| 2001/0032205 | A1 | 10/2001 | Kubaitis |
| 2001/0034628 | A1* | 10/2001 | Eder .................................. 705/7 |
| 2002/0046053 | A1 | 4/2002 | Hare et al. |
| 2002/0062341 | A1 | 5/2002 | Sueki et al. |
| 2002/0073075 | A1 | 6/2002 | Dutta et al. |
| 2002/0143665 | A1* | 10/2002 | Santos et al. .................... 705/28 |
| 2002/0143669 | A1* | 10/2002 | Scheer ............................ 705/28 |
| 2002/0143933 | A1 | 10/2002 | Hind et al. |
| 2002/0161673 | A1 | 10/2002 | Lee et al. |
| 2003/0014399 | A1 | 1/2003 | Hansen et al. |
| 2003/0018799 | A1 | 1/2003 | Eyal |
| 2003/0055816 | A1 | 3/2003 | Paine et al. |
| 2003/0154442 | A1 | 8/2003 | Papierniak |
| 2003/0171977 | A1 | 9/2003 | Singh et al. |
| 2003/0191754 | A1 | 10/2003 | Dey et al. |
| 2003/0195812 | A1 | 10/2003 | Nguyen |
| 2003/0200134 | A1 | 10/2003 | Leonard et al. |
| 2003/0229537 | A1 | 12/2003 | Dunning et al. |
| 2004/0059746 | A1 | 3/2004 | Error et al. |
| 2004/0088241 | A1 | 5/2004 | Rebane et al. |
| 2004/0158560 | A1 | 8/2004 | Wen et al. |
| 2004/0220905 | A1 | 11/2004 | Chen et al. |
| 2004/0220925 | A1 | 11/2004 | Liu et al. |
| 2004/0225647 | A1 | 11/2004 | Connelly et al. |
| 2005/0273379 | A1 | 12/2005 | Mathews et al. |
| 2006/0004716 | A1 | 1/2006 | Hurst-Hiller et al. |
| 2006/0190355 | A1 | 8/2006 | Jammes et al. |
| 2007/0162442 | A1 | 7/2007 | Brill et al. |

OTHER PUBLICATIONS

Clieaf, Mark Van. "Identifying your Most Profitable Customers," Business Quarterly, pp. 54-60; Winter 1996.

Non-Final Office Action of Jun. 27, 2011 for U.S. Appl. No. 12/463,003, 16 pages.

Notice of Allowance of Jan. 25, 2012 for U.S. Appl. No. 12/463,003, 14 pages.

Ktmatu:relax, http://ktmatu.com/software/relax (54 pp.).

Undated publication entitled "Web Services with SAS® Enabling New Opportunities for Your Business" (9 pp.).

Undated publication entitled "SAS® Web Report Studio—An Introduction and Overview" (32 pp.).

"HitBox Professional Service Highlights", http://www.hitboxprofessional.com/learn/features.html (11 pp.).

Aberdeen Group, Inc., "Web Analytics: Translating Clicks into Business", 159 pp. (Dec. 2000).

SAS Institute Inc. 2009, "Getting Started with SAS Profitability Management 2.1", Cary, NC: SAS Institute (158 pp).

SAS Profitability Management 2.1, SAS Institute (70 pp).

* cited by examiner

MATCH TO FIG. 6A

| [read-only] | | |
|---|---|---|
| Distance | Difficulty | SoldQty |
| 9000 | 4 | 158 |
| 9000 | 4 | 696 |
| 6600 | 4 | 849 |
| 8000 | 4 | 2723 |
| 8000 | 4 | 3176 |
| 8000 | 4 | 1243 |
| 9800 | 4 | 1300 |
| 6500 | 4 | 1112 |
| 6500 | 4 | 5253 |
| 6500 | 4 | 1266 |
| 6500 | 4 | 1750 |
| 6500 | 4 | 2849 |
| 6500 | 4 | 2031 |
| 6500 | 4 | 2385 |
| 6500 | 4 | 1256 |
| 6500 | 4 | 1485 |
| 9300 | 4 | 3916 |
| 9000 | 4 | 217 |
| 9000 | 4 | 3490 |
| 8200 | 4 | 985 |
| 8200 | 4 | 2055 |
| 8200 | 4 | 2828 |
| 6500 | 4 | 1141 |
| 6500 | 4 | 200 |
| 8100 | 4 | 2032 |
| 6500 | 4 | 1349 |
| 9400 | 4 | 3054 |
| 6600 | 4 | 2975 |
| 7400 | 4 | 2753 |
| 7400 | 4 | 1767 |

410 → [read-only]
420 → SoldQty

| Queue | Server | sasdemo as SAS Demo User, connected to sasbi:8561/Foundation

COMPUTER-IMPLEMENTED SYSTEMS AND METHODS FOR DETERMINING FUTURE PROFITABILITY

CROSS-REFERENCE TO RELATED APPLICATIONS

The present application is a continuation of U.S. patent application Ser. No. 12/463,003 filed May 8, 2009 now U.S. Pat. No. 8,185,432, entitled "Computer-Implemented Systems and Methods for Determining Future Probability," which is hereby incorporated by reference in its entirety.

TECHNICAL FIELD

The technology described herein relates generally to systems and methods for determining business performance. More specifically, the technology described herein relates to determining future profitability.

BACKGROUND

In order to improve the profitability of an entity, such as a business, managers of the entity may use forecasts that attempt to predict the results of the entity's operations in future periods. These forecasts may focus on various aspects of the entity's operations, such as inventory management or predicted future input costs. The aspects of the entity's operations chosen for forecasting may be aspects that affect the overall profitability of the entity's operations, but they may not present a coherent overall picture of the future profitability of the entity's operations. For example, rigorous inventory management based upon forecasts of anticipated supply and demand could provide an entity the opportunity to reduce costs of storing and shipping inputs and finished inventory, which could lead to increased profitability. Forecasts that focus primarily on inventory management, though, do not incorporate other aspects of the entity's operations that could be negatively affected if, for example, rigorous inventory control occasionally were to result in shortages of supply to the entity's customers. Such shortages potentially could reduce or eliminate the additional profit that might be derived from the rigorous inventory control.

SUMMARY

In accordance with the teachings herein, computer-implemented systems and methods are provided for determining future profitability, including components of profitability, of an entity. For example, a system and method can generate a present profitability model for an entity based upon present values for a plurality of components of profitability. The present profitability model is used to create a future profitability forecast for the entity.

As another example, a system and method can be configured to receive input data comprising present values for a plurality of components of profitability and generate a present profitability model for the entity, wherein the present profitability of the entity is modeled based upon the input data. A profitability driver forecast is produced and comprises expected future values for a profitability driver, wherein the profitability driver is one of the plurality of components of profitability. The expected future values of the profitability driver are inputted into the profitability model and the present profitability model is applied to the input expected future values of the profitability driver to create a future profitability forecast for the entity.

As another example, an entity may generate a model of its present profitability based on various aspects of the entity's operations. These aspects, which may be called components of profitability, could include components such as a number of transactions, costs per unit or transaction, interest rates over a period, total revenues, or other aspects of the entity's operations. A model of present profitability can include the components of profitability and provide for the impact of each component on the entity's profitability for the period studied. Once a model of present profitability has been generated, the model also may be used to forecast future profitability of the entity. Forecasting of future profitability can also make use of forecasted values for one or more of the components of profitability, which are input to the present profitability model to generate forecasted profitability values for the entity. Incorporating multiple aspects of an entity's operations can lessen the uncertainty that could result from a forecast with a narrower focus.

DETAILED DESCRIPTION

Figure 1:
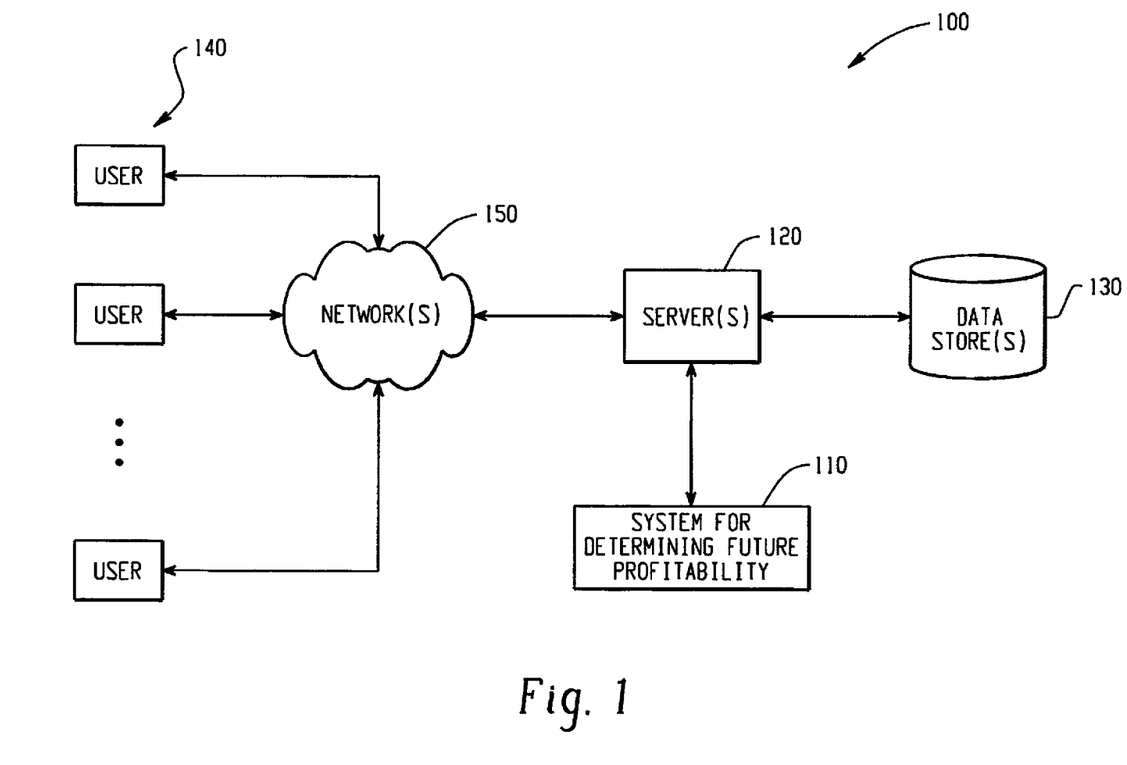
FIG. 1 is a block diagram depicting an environment in which users can interact with a system for determining future profitability.

FIG. 1 depicts at 100 an environment in which one or more users can interact with a system 110 for determining not only present value of profitability but also future profitability. Present value of profitability is determined based on a number of underlying profitability components, such as the volume of transactions associated with products/services, costs, revenues, and rates charged for those products/services. The future profitability system 110 determines the present value of profitability as well as determining in an automated manner a "future" value of profitability.

To generate a future value of profitability, the system 110 receives input data about the results of operations of an entity. For example, an entity's revenue figures, input costs, or number of transactions can be the input to the system 110. The system 110 uses the input data to model the profitability of the entity, which forms the basis for forecasting the expected future profitability of the entity, data about which the system 110 may output and/or persist.

As an illustration, the future profitability system 110 can be used in a product manufacturing context, such as an electronics manufacturer. The future profitability system 110 can help guide the manufacturer's decisions about the future, such as quantity of an item to manufacture, pricing, distribution of manufactured units, etc. For example, a manufacturer, (which in this hypothetical is called TV Inc.) builds and sells a 50" flat-panel television, model number FD5020. TV Inc. wishes to determine the future profitability of sales of the FD5020. TV Inc. sells the FD5020 to customers in various segments, such as direct sales (i.e., to consumer electronics retailers), sales to resellers (i.e., companies that customize or add features to the television and resell the altered product), and government sales. There may be any number of individual customers within a particular segment. TV Inc. can use its existing data about sales of the FD5020 to generate a model of the present profitability of the FD5020 (i.e., what is the profitability on this present date). Each data series TV Inc. collects and uses to generate the model could be referred to as a candidate component of profitability. Once the system 110 generates the present profitability model, TV Inc. can select one or more of the candidate components to be forecast and used to determine forecasted values for future profitability.

The one or more candidate components chosen to be forecast are referred to as profitability drivers. That is, these are aspects of TV Inc.'s manufacture and sales of the FD5020 that a user at TV Inc. believes drive (e.g., are a significant reason for) the profitability of the product. Thus, these aspects are the ones that TV Inc. will desire to forecast and use as the basis for determining future profitability (e.g., what profitability can the company expect in the future). If TV Inc. believes all of the candidate components potentially affect profitability (e.g., if TV Inc. does not collect data on a large number of aspects of its operations related to the FD5020), then all of the candidate components may be chosen and forecast for use in determining future profitability. If TV Inc. chooses only a subset of the candidate components, then the non-chosen candidate components may be held constant for purposes of determining forecasted values for future profitability. A user of the system 110 also has the option to determine at what granularity forecasted values for future profitability are determined. Thus, while TV Inc. may be primarily interested in the overall profitability of the FD5020, forecasted values can be associated particular aspects of the company's operations. For example, forecasted profitability values could be associated with the various segments in which TV Inc. has customers, or the forecasted values could be associated on a per-customer basis. The ability to have finer granularity in the forecasted values gives TV Inc. additional information that can allow the company to improve its operational decisions.

To perform future profitability operations for generating such results, the future profitability system 110 may operate on one or more servers 120. The server(s) 120, in turn, may be connected to one or more data stores 130, which may store the input, output, or both of the future profitability system 110. Users 140 may access the system 110 over one or more networks 150 that are linked to the one or more servers 120 on which the system 110 executes.

Figure 2:
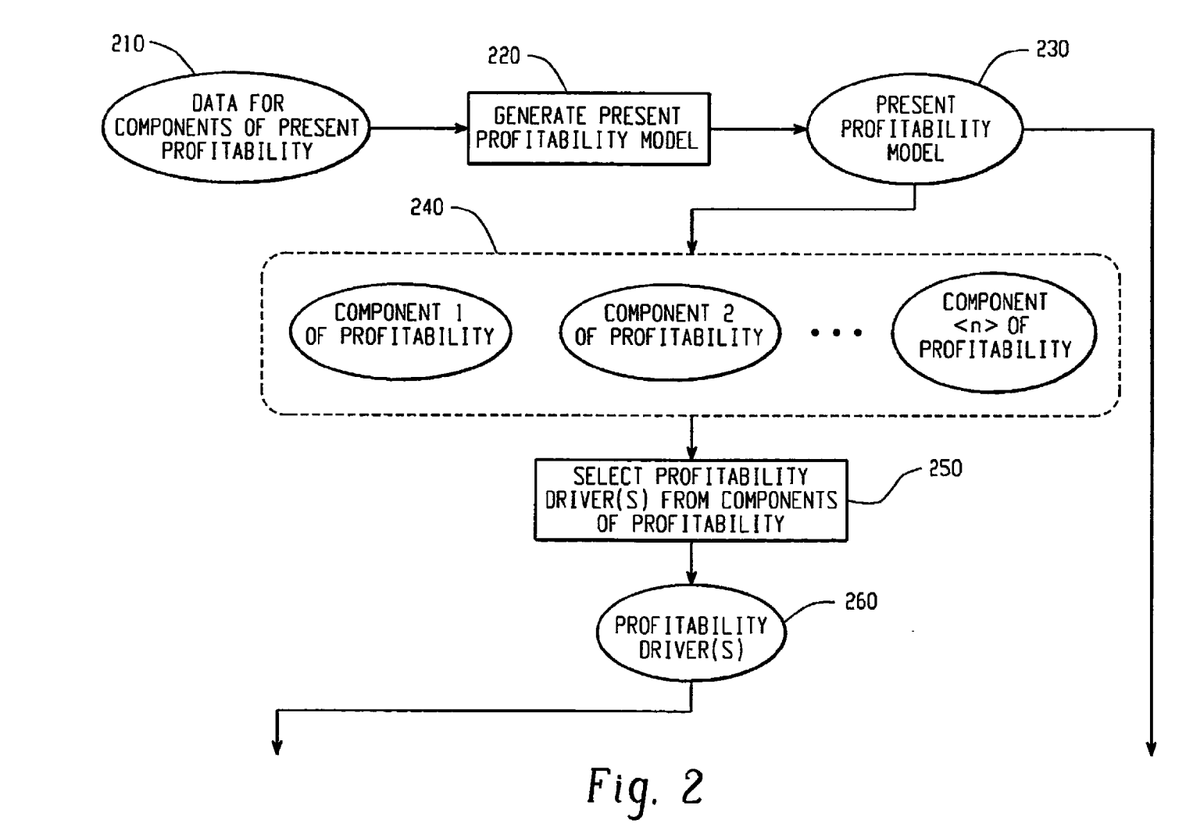
FIGS. 2 and 3 are block diagrams depicting elements of an example system for determining future profitability.
Figure 3:
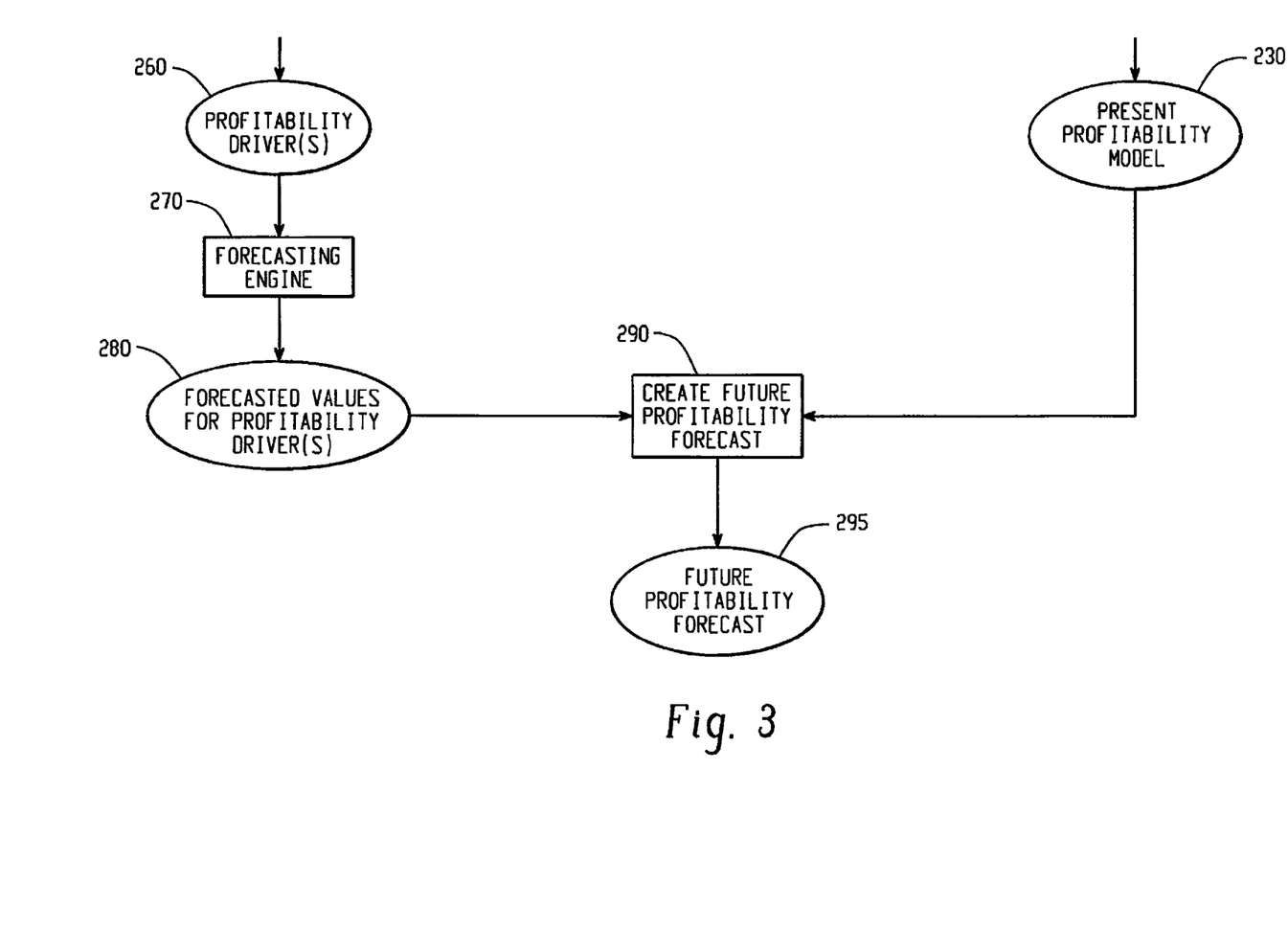

FIGS. 2 and 3 depict example components of a system for determining future profitability. In FIG. 2, data for components of present profitability 210 is input to the example system. Components of profitability, either present profitability or future profitability, may include various aspects of an entity's operations. For example, in a business the components of profitability for a given period could include aspects such as number of transactions, input costs, total revenue, or interest rates. As shown at 220, the data 210 is used to generate a present profitability model 230. A profitability modeling system may be used to generate the present profitability model 230, such as SAS Profitability Management, available from SAS Institute Inc. An example of a model that may be used to model present profitability is an activity-based costing (ABC) model, a model the use of which is described in the publicly-available document "Getting Started with SAS® Profitability Management 2.1," available from SAS Institute Inc. (may be accessed at http://support.sas.com/documentation/onlinedoc/pm/tutorial21.pdf).

The generated present profitability model 230 describes how the components of profitability identified for a particular entity contribute to the entity's profitability. Thus, one result of the generation of the present profitability model is the group of candidate components of profitability 240 for selection. At 250, the system selects one or more of the components of profitability to serve as profitability drivers for purposes of determining future profitability. The one or more of the components can be manually selected by a user, or can be automatically selected such as by a data mining or statistical algorithm technique (e.g., decision tree approach, regression analysis, statistical correlation analysis, principle component analysis, etc.) that would select the drivers that have the highest impact on the overall profitability. The selected profitability drivers 260, along with the generated present profitability model 230, are used by the system to determine future profitability.

With reference to FIG. 3, the profitability drivers 260 (that were selected at 250) are input to the forecasting engine 270. The forecasting engine 270 may be any forecasting system capable of producing forecasted values for the selected profitability drivers 260, such as SAS Forecast Server, sold by SAS Institute Inc.

The forecasting engine 270 produces forecasted values for the profitability drivers 280. At 290, the forecasted values 280 are input to the present profitability model 230 in order to create a future profitability forecast 295. In this example, the components of profitability in the group 240 that are not selected as profitability drivers are held constant in the present profitability model 230. This allows the system to isolate the effects on profitability of forecasted values for a more limited number of components of profitability, for example the selected profitability drivers may be those components of profitability that a user of the system has determined are most important or most subject to the entity's control. In another example, the profitability modeling system responsible for generating the present profitability model 230 may select those components of profitability that the system determines are the most significant to serve as the profitability drivers.

The example system uses the same profitability model 230 that was generated to model present profitability to also create the future profitability forecast 295. This provides added confidence regarding the dependability of the future profitability forecast 295, as the model 230 has been generated specifically to model the entity's present results, thereby reducing a potential source of uncertainty in the forecast 295.

Figure 4:
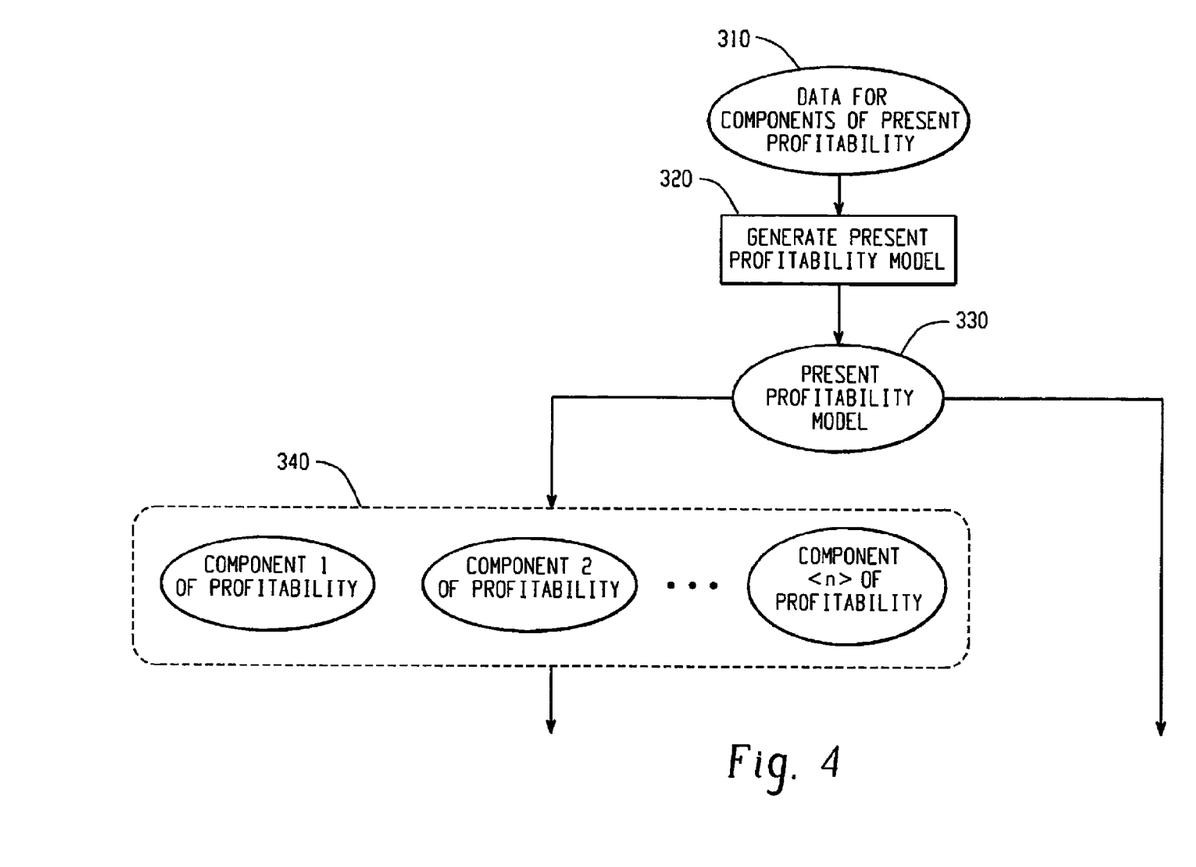
FIGS. 4 and 5 are block diagrams depicting elements of another example system for determining future profitability.
Figure 5:
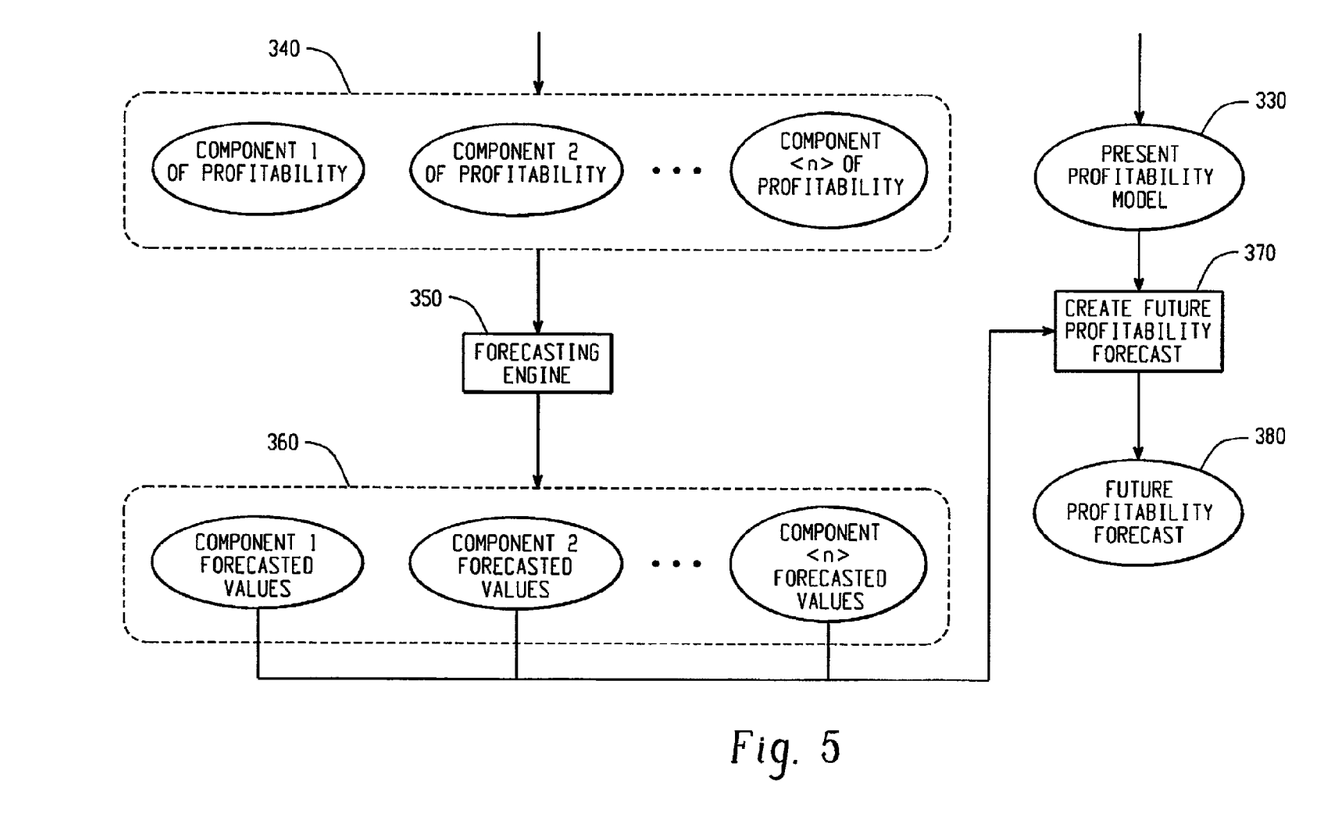

It should be understood that the operational scenario depicted in FIGS. 2 and 3 may be altered, modified, removed and/or augmented and still achieve the desired outcome. As an illustration, FIGS. 4 and 5 depict features which can be added to a future profitability system. With reference to FIG. 4, data for components of present profitability 310 for an entity is input to the system. As shown at 320, the data 310 is used by the system to generate a present profitability model 330. As discussed previously, the model 330 represents the present profitability of the entity. The model 330 will then form the basis of the forecast for future profitability. The model 330 includes the effects on profitability of the components of profitability for which data was input. These components are included in the group of profitability components 340.

In this example system, all of the components of profitability in the group 340 function as profitability drivers. Thus, as depicted in FIG. 5, the present profitability model 330 and the group of components of profitability 340 are used to create a future profitability forecast. The components in the group 340 are input to a forecasting engine 350, which produces forecasted values 360 for each of the input components of profitability. The forecast engine may be setup to automatically select the best forecasting algorithm that fits each component's data, rather than using the same forecasting method for each of the components of profitability. The use of the optimal forecasting algorithm for each component can result in greater confidence in the forecasted values for future profitability, once the forecasted values for the components are used to generate the future profitability forecast.

The forecasted values 360 are used in conjunction with the present profitability model 330 to create a future profitability forecast 380. In the other example system discussed above, values for components not selected as profitability drivers were held constant. In this example system, forecasted values 360 are generated for each of the components of profitability. The forecasted values 360 are input to the present profitability model 330, as shown at 370, to create the future profitability forecast 380. In this example system, the forecast 380 will incorporate the forecasted effects of each of the components of profitability 340, because the forecasting engine 350 was used to forecast values for each component and all of the forecasted values for the components are input to the present profitability model 330.

In another example system, the future profitability forecast 380 may include confidence intervals related to one or more of the forecasted values. For example, if the forecasting engine 350 generates forecasted values for component 1 of profitability, the values generated by forecasting engine 350 may include a confidence interval. If the example component 1 were overall revenue, the forecasting engine might forecast that the entity will have $4 million dollars in revenue for the next calendar quarter. A confidence interval for such a forecast might indicate that there is a 95% confidence in the forecast that the next calendar quarter's revenue will be $4 million, plus or minus five percent (or $200,000). The inclusion of confidence intervals for forecasted values also may permit an example system to create forecasted values for future profitability that include confidence intervals. The confidence intervals associated with the forecasted values for future profitability provide additional information that can be used, for example, by a user or analytical process to improve decisions regarding an entity's operations that are made based on the forecasted values for future profitability.

Figure 6A:
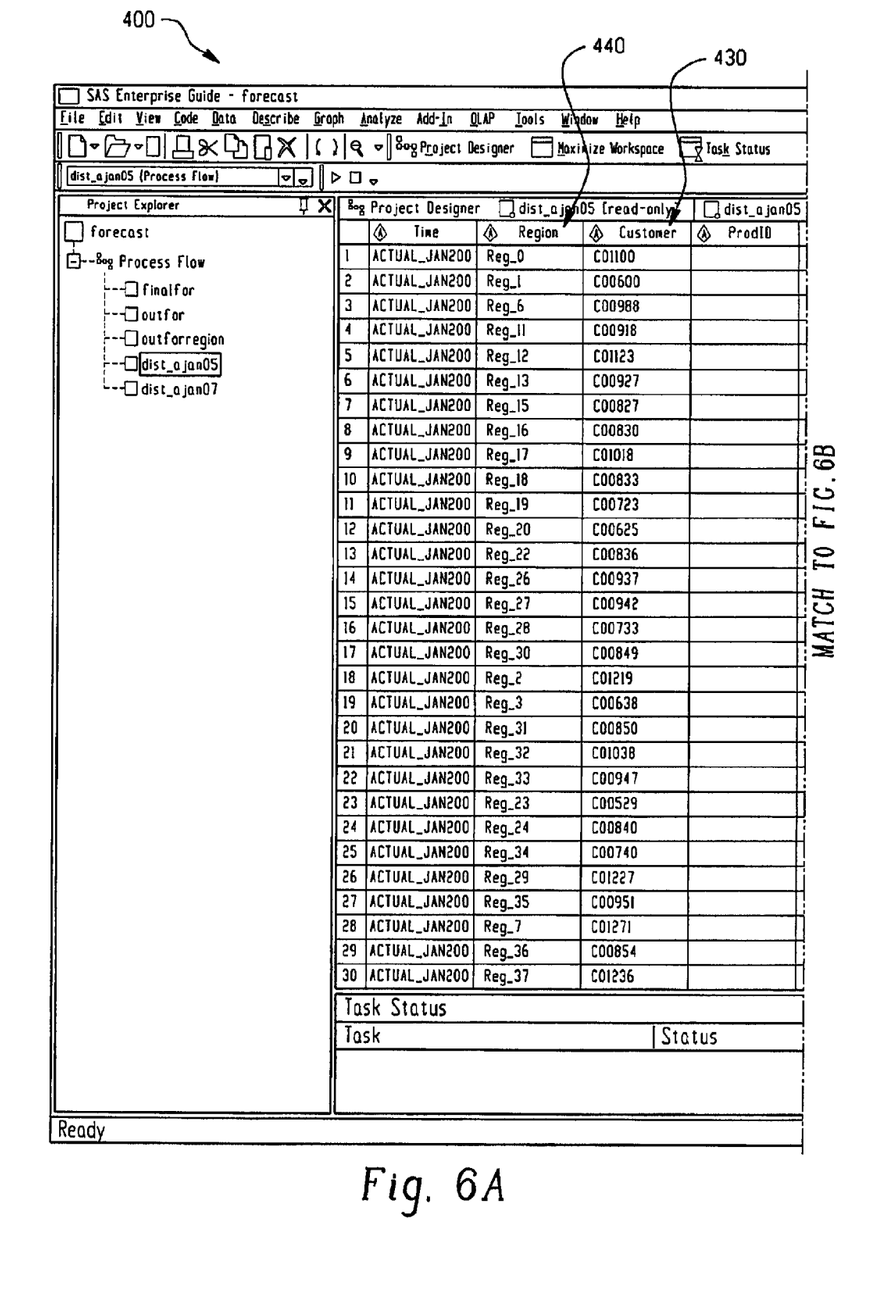
FIGS. 6-8 are example user interfaces for a system for determining future profitability.
Figure 6B:
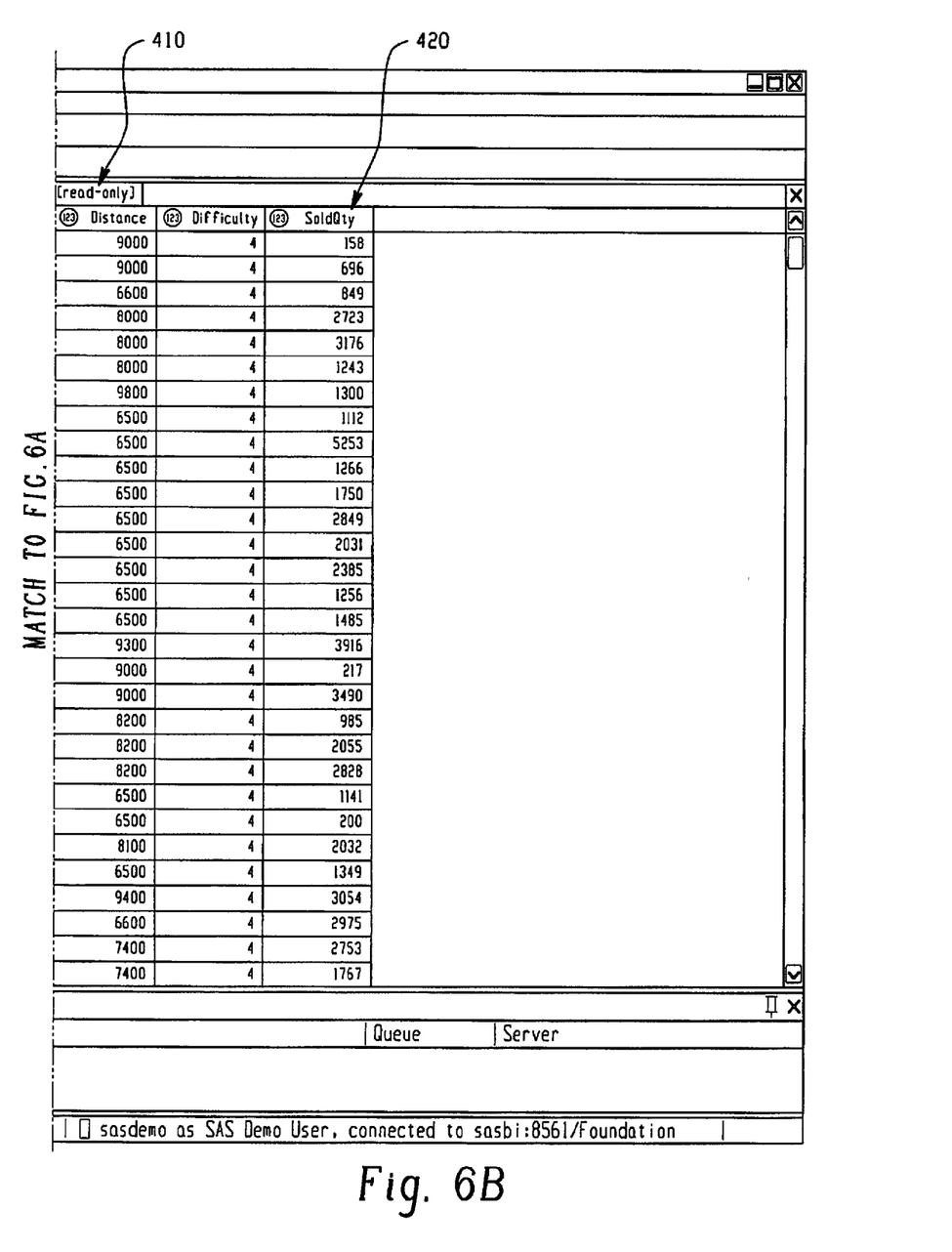

FIG. 6 depicts at 400 an example interface illustrating example input data for a system to determine future profitability. The columnar data depicted at 410 is example input data to the system for the monthly period of January 2005. The input data 410 represents unified raw data that is formatted for input to the system. Raw data can originate in a variety of places (e.g., computer tracking systems, manually entered data, etc.), and can be in many different formats. In the example data, various aspects of the entity's actual operational results for the month are shown. For instance, the data shows quantities 420 of product sold to various customers 430 of the entity. The entity's customers 430 have been assigned customer numbers and each customer is assigned to a region as shown at 440. Any additional aspects of the operational results that are considered important by the entity could be included in the input data. For example, a column for product ID is included in the data 410, but in this instance the column is blank. The blank field could be indicative of an entity that sells only one product, or that sells only one product to this particular set of customers. In other examples, sales for multiple products could be tracked in order to provide additional information regarding the entity's operational results. In addition, there may be more than one input file for the system. The example file 410 depicts a distribution file, but other input files could include cost files or revenue files. In the distribution file depicted at 410, there are three independent variables: distance, difficulty, and sold quantity. The independent variables can be selected as profitability drivers within this example operational scenario.

Once data is input, a user may create rules to determine, for example, how revenues or expenses are allocated to particular transactions. In this way, a user creates criteria by which behaviors are related to transactions and the formula for the allocation. The rules might be used by a specific revenue or expense or they might be used for multiple revenues or expenses. Once the behaviors, transactions, and rules have been defined, a user can then calculate the results at the lowest level of detail. The rules are associated with the revenue and expenses (behaviors) and then applied to the appropriate transactions. The calculations can be used to generate new columns in the transaction file, for example, value and behavior ID. The value represents the calculated amount for the transaction according to the formula in the rule. The behavior ID represents the calculated amount of the behavior.

Figure 7A:
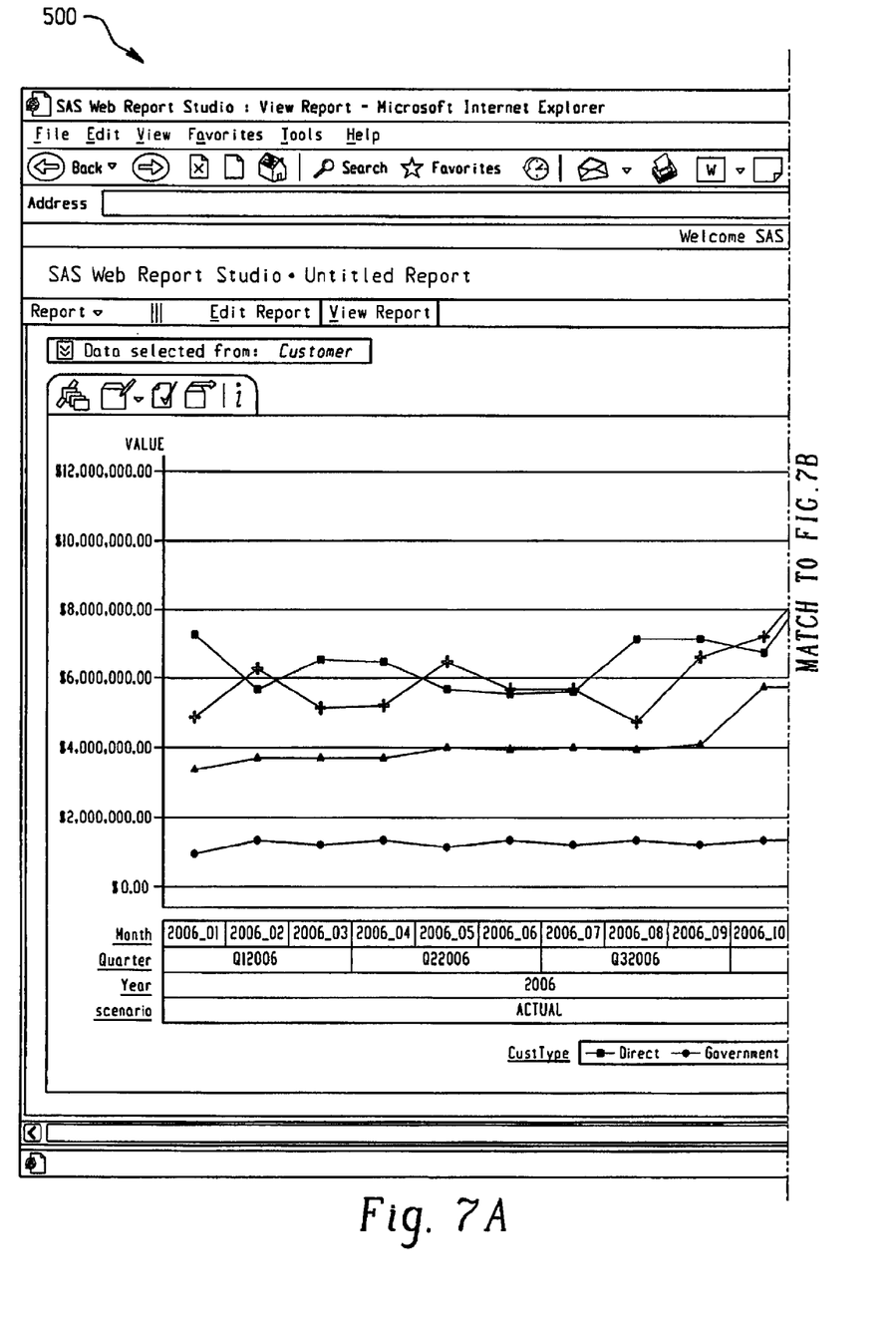
Figure 7B:
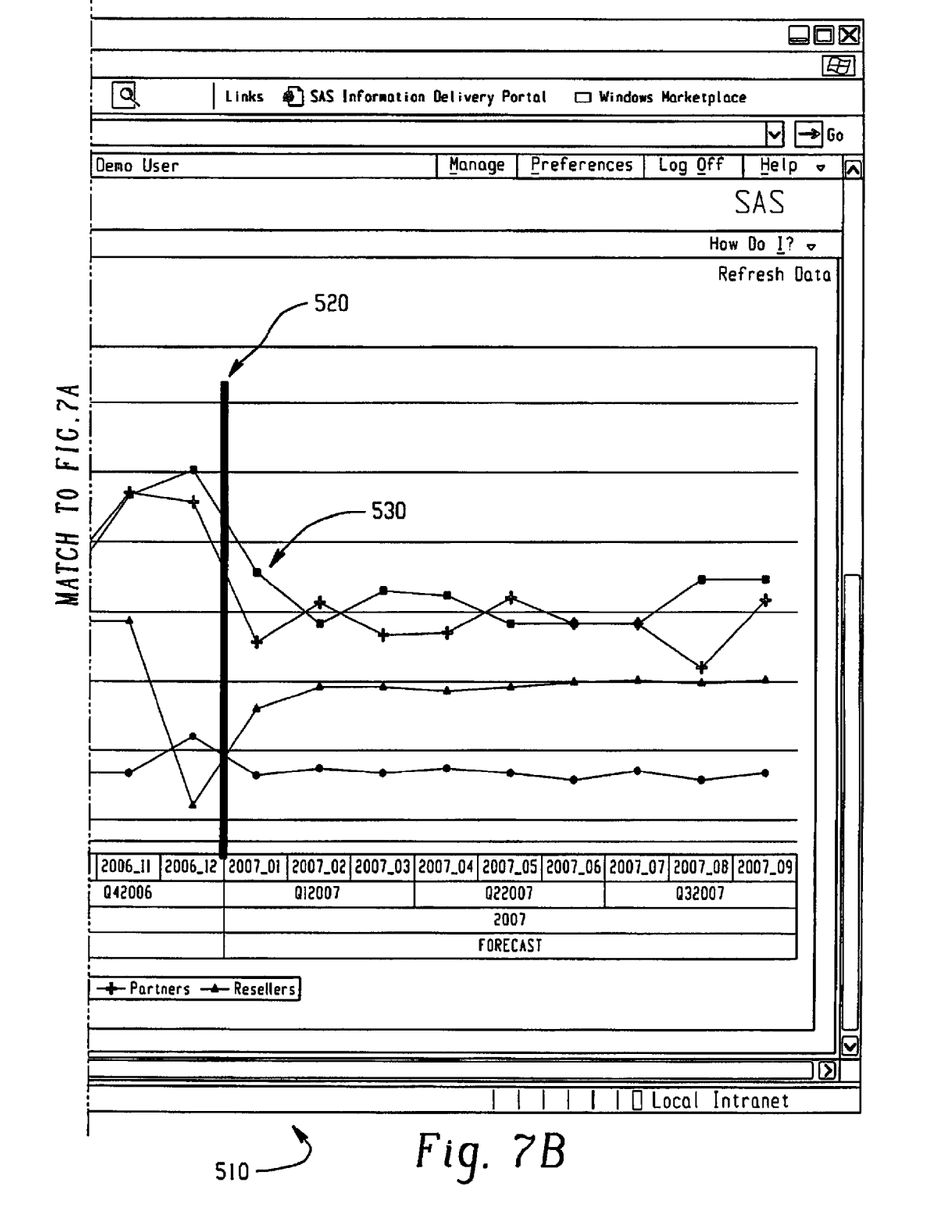

FIG. 7 depicts at 500 results from determining future profitability, where the sold quantity component of the input data was allowed to vary, and the other components were held constant. At 510, both past and present operational results from the present profitability modeling and future profitability modeling are shown. The line 520 demarcates the present time for forecasting purposes—the values to the left of line 520 are historical or present data regarding the entity's profitability, while values to the right of line 520 are forecasted future values for the entity's profitability. The indicated time for generation of the graph 510 is approximately the beginning of 2007. In this example, the different lines in the graph 510 represent different types of customers the entity has. Specifically, the entity has categorized its customers as direct, government, partner, or reseller. Because this categorization is important to the example entity, forecasted values for future profitability are generated for each type of customer. The direct customers are represented by the graph line 530. If the entity needs only to see forecasted future profitability at this granularity, the system may be configured to produce only these values. In another example, though, the entity may wish to see additional detail regarding its customers in each of the customer categories. Thus, for example, a user may wish to "drill down" into the direct customer category in order to see the forecasted values for each of the direct customers.

Figure 8A:
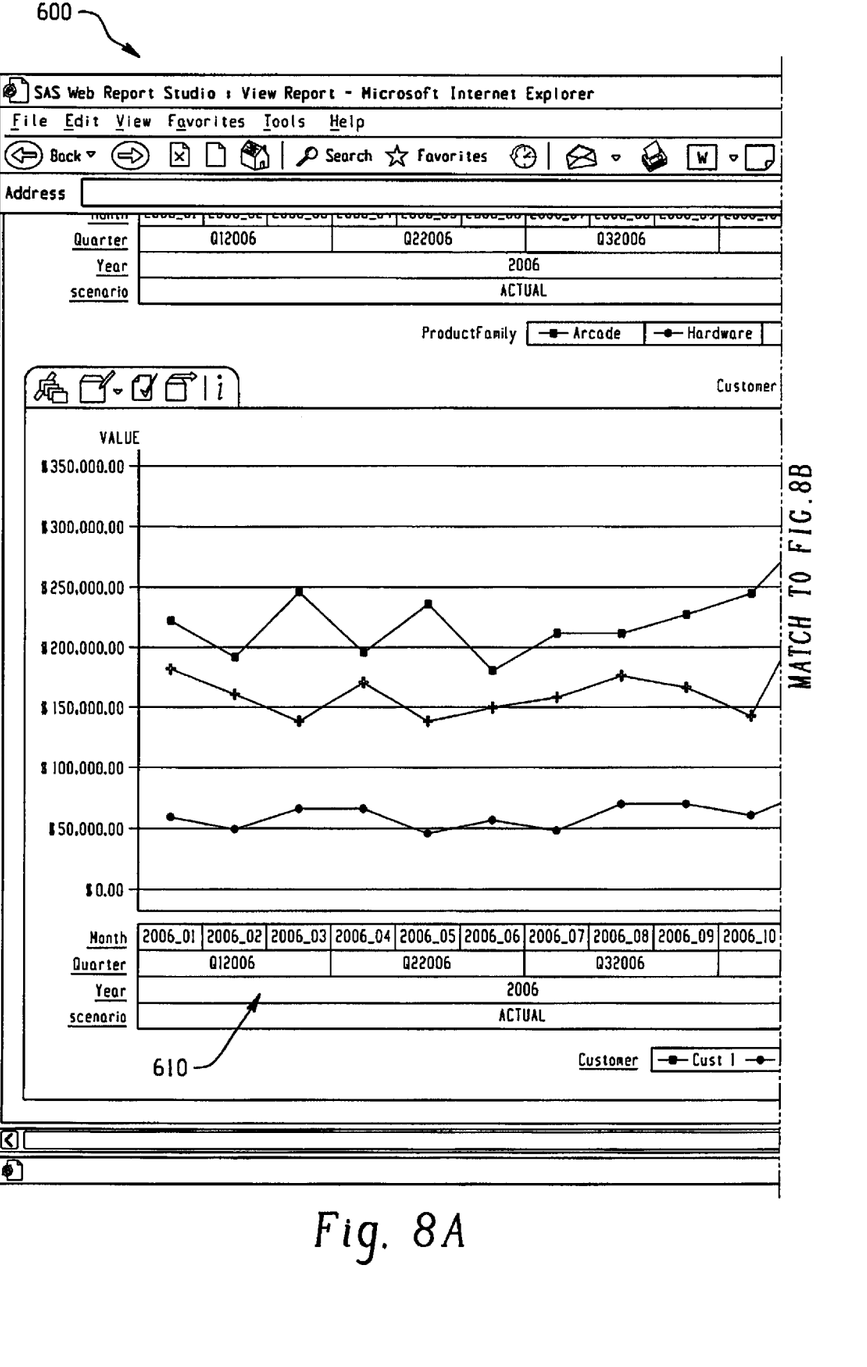
Figure 8B:
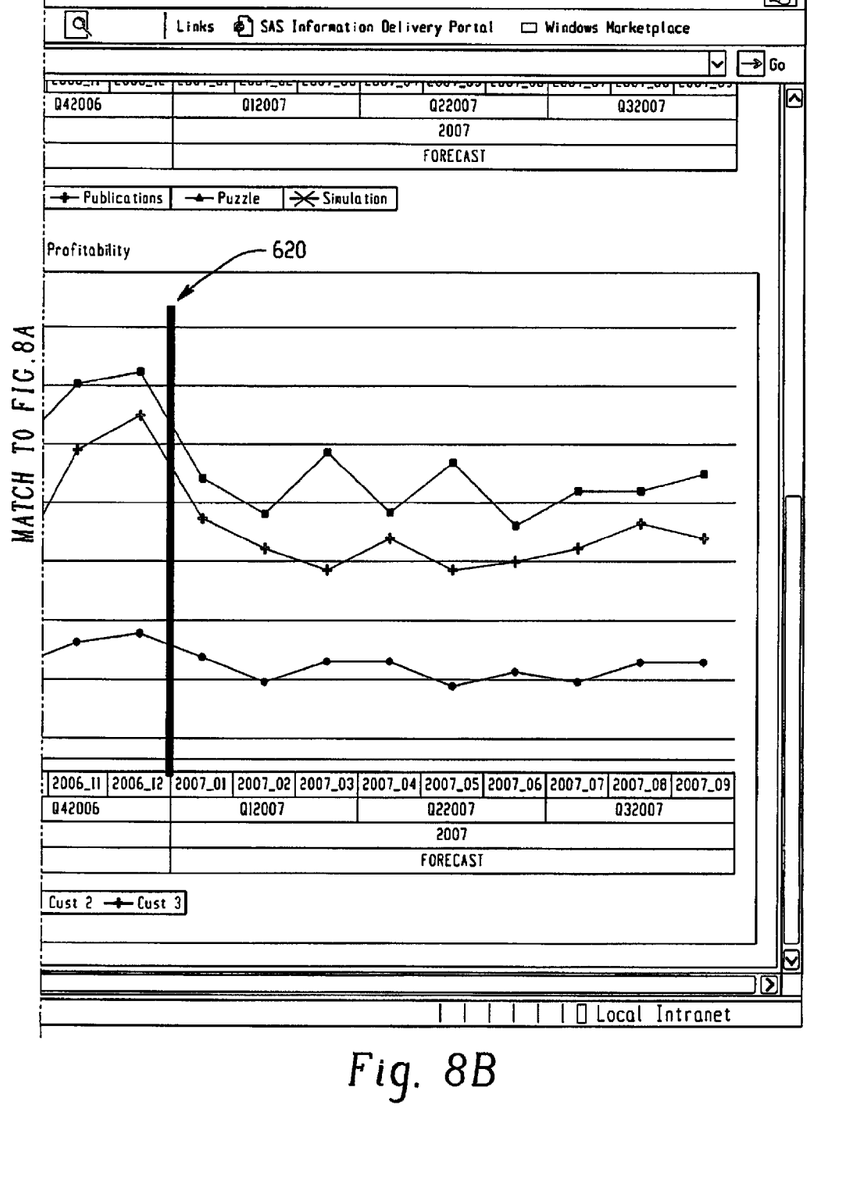

FIG. 8 depicts at 600 an example interface illustrating how a user of a system for determining future profitability might interact with the system. The customer profitability graph 610 displays monthly values for historical and forecasted profitability for three customers. In this example, the three customers comprise the group of direct customers for the entity represented by the graph line 530 discussed above. The timeframe represented by the graph 610 is the same as that in graph 510. Graph 610 simply shows a user additional details of the forecasted values produced by the example system. As indicated in the graph, the values to the left of the present time indicator 620 are historical profitability values for each direct customer, while the values to the right of the indicator 620 are forecasted profitability values output by the example system. Once future profitability values have been forecast by the system, it is possible to formulate linear programming problems (i.e., apply operation research algorithms) to determine an optimal mix of products/services, transaction volumes, costs, and rates to use across a portfolio of products/services in order to maximize profit or minimize costs for an entity.

Figure 9:
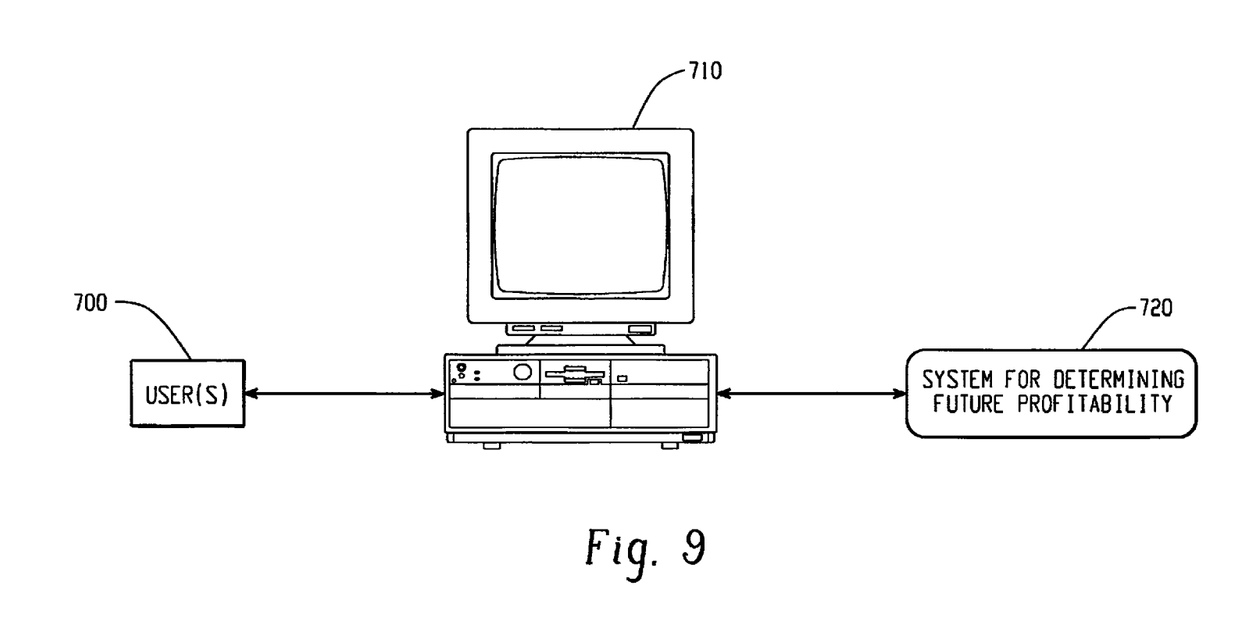
FIG. 9 is a block diagram depicting a single general-purpose computer environment wherein a user can interact with a system for determining future profitability.

While examples have been used to disclose the invention, including the best mode, and also to enable any person skilled in the art to make and use the invention, the patentable scope of the invention is defined by claims, and may include other examples that occur to those skilled in the art. Accordingly the examples disclosed herein are to be considered non-limiting. As an illustration, the systems and methods may be implemented on various types of computer architectures, such as for example on a single general purpose computer (as shown at 710 on FIG. 9) or workstation, operated by one or more users 700 interacting with an example system for determining future profitability 720, or on a networked system, or in a client-server configuration, or in an application service provider configuration.

Further, the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

In addition, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program. For example, the various cluster structures described herein can be stored in one or more data structures, such as in the following manner. A computer-readable storage medium has stored thereon cluster data structures that are created based upon a data set containing a plurality of input variables, the data structure comprising: a first data structure containing the data set; a second data structure containing one or more global clusters created by computing a distance matrix from the data set; a third data structure containing a global cluster structure; a fourth data structure containing a sub-cluster structure; and a fifth data structure containing a cluster structure formed by combining the global cluster structure and the sub-cluster structure; wherein the global cluster structure and the sub-cluster structure are created using a latent variable clustering technique.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method, comprising:
   generating a present profitability model, wherein the present profitability model is associated with one or more components;
   determining a set of multiple components;
   determining a set of one or more profitability drivers from amongst the set of multiple components, wherein the profitability drivers are correlated with a profitability of an entity;
   isolating components that are not in the set of profitability drivers, wherein isolated components are held constant;
   forecasting one or more future values for each of the one or more profitability drivers; and
   generating, by a computing device, a future probability forecast using the one or more future values, the isolated components, and the present profitability model.

2. The method of claim 1, wherein the future probability forecast indicates forecasted profit for the entity.

3. The method of claim 1, wherein generating the future probability forecast includes generating one or more future forecasts and a confidence interval for each of the one or more future forecasts.

4. The method of claim 1, wherein generating the future probability forecast includes using an activity based costing model.

5. The method of claim 1, wherein generating the present profitability model includes determining mathematical relationships in historical data between the components of the set and profitability of the entity.

6. The method of claim 1, wherein the components of the set are independent variables and the present profitability model includes relationships between independent variables and profitability of the entity within a set of historical data.

7. The method of claim 6, wherein the isolated components are independent variables which, within the historical data, are less correlated with profitability of the entity than profitability driver variables.

8. The method of claim 1, wherein the profitability drivers are independent variables, and wherein each profitability driver is determined based on a profit correlation with the entity.

9. The method of claim 1, further comprising:
   using the present profitability model to determine an effect of a component of the set on profitability of the entity.

10. The method of claim 1, wherein isolating further comprises holding the isolated components constant in the present profitability model.

11. A system, comprising:
one or more data processors; and
one or more non transitory computer-readable storage media containing instructions configured to cause the one or more processors to perform operations including:
  generating a present profitability model, wherein the present profitability model is associated with one or more components;
  determining a set of multiple components;
  determining a set of one or more profitability drivers from amongst the set of multiple components, wherein the profitability drivers are correlated with a profitability of an entity;
  isolating components that are not in the set of profitability drivers, wherein isolated components are held constant;
  forecasting one or more future values for each of the one or more profitability drivers; and
  generating a future probability forecast using the one or more future values, the isolated components, and the present profitability model.

12. The system of claim 11, wherein the future probability forecast indicates forecasted profit for the entity.

13. The system of claim 11, wherein generating the future probability forecast includes generating one or more future forecasts and a confidence interval for each of the one or more future forecasts.

14. The system of claim 11, wherein generating the future probability forecast includes using an activity based costing model.

15. The system of claim 11, wherein generating the present profitability model includes determining mathematical relationships in historical data between the components of the set and profitability of the entity.

16. The system of claim 11, wherein the components of the set are independent variables and the present profitability model includes relationships between independent variables and profitability of the entity within a set of historical data.

17. The system of claim 16, wherein the isolated components are independent variables which, within the historical data, are less correlated with profitability of the entity than profitability driver variables.

18. The system of claim 11, wherein the profitability drivers are independent variables, and wherein each profitability driver is determined based on a profit correlation with the entity.

19. The system of claim 11, further comprising instructions configured to cause the one or more processors to perform operations including:
  using the present profitability model to determine an effect of a component of the set on profitability of the entity.

20. The method of claim 11, wherein isolating further comprises holding the isolated components constant in the present profitability model.

21. A computer-program product tangibly embodied in a non-transitory machine-readable storage medium, including instructions configured to cause a data processing apparatus to:
  generate a present profitability model, wherein the present profitability model is associated with one or more components;
  determine a set of multiple components;
  determine a set of one or more profitability drivers from amongst the set of multiple components, wherein the profitability drivers are correlated with a profitability of an entity;
  isolate components that are not in the set of profitability drivers, wherein isolated components are held constant;
  forecast one or more future values for each of the one or more profitability drivers; and
  generate a future probability forecast using the one or more future values, the isolated components, and the present profitability model.

22. The computer-program product of claim 21, wherein the future probability forecast indicates forecasted profit for the entity.

23. The computer-program product of claim 21, wherein generating the future probability forecast includes generating one or more future forecasts and a confidence interval for each of the one or more future forecasts.

24. The computer-program product of claim 21, wherein generating the future probability forecast includes using an activity based costing model.

25. The computer-program product of claim 21, wherein generating the present profitability model includes determining mathematical relationships in historical data between the components of the set and profitability of the entity.

26. The computer-program product of claim 21, wherein the components of the set are independent variables and the present profitability model includes relationships between independent variables and profitability of the entity within a set of historical data.

27. The computer-program product of claim 26, wherein the isolated components are independent variables which, within the historical data, are less correlated with profitability of the entity than profitability driver variables.

28. The computer-program product of claim 21, wherein the profitability drivers are independent variables, and wherein each profitability driver is determined based on a profit correlation with the entity.

29. The computer-program product of claim 21, further comprising instructions configured to cause a data processing apparatus to:
  use the present profitability model to determine an effect of a component of the set on profitability of the entity.

30. The computer-program product of claim 21, wherein isolating further comprises holding the isolated components constant in the present profitability model.

* * * * *

UNITED STATES PATENT AND TRADEMARK OFFICE
CERTIFICATE OF CORRECTION

Page 1 of 1

PATENT NO. : 8,473,331 B2
APPLICATION NO. : 13/433319
DATED : June 25, 2013
INVENTOR(S) : David Carter Pope et al.

It is certified that error appears in the above-identified patent and that said Letters Patent is hereby corrected as shown below:

On the title page

In the Inventors Section, item (75), please delete

"Liewellyn"

And insert

--Llewellyn--

Signed and Sealed this
Twentieth Day of May, 2014

Michelle K. Lee
*Deputy Director of the United States Patent and Trademark Office*